United States Patent
Hung

(10) Patent No.: US 9,921,915 B2
(45) Date of Patent: Mar. 20, 2018

(54) BASEBOARD MANAGEMENT CONTROLLER RECOVERY

(71) Applicant: Quanta Computer Inc., Taoyuan (TW)

(72) Inventor: Ming-Hung Hung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 195 days.

(21) Appl. No.: 14/885,157

(22) Filed: Oct. 16, 2015

(65) Prior Publication Data

US 2017/0109235 A1    Apr. 20, 2017

(51) Int. Cl.
*G06F 11/00* (2006.01)
*G06F 11/14* (2006.01)
*G06F 21/57* (2013.01)

(52) U.S. Cl.
CPC ...... *G06F 11/1417* (2013.01); *G06F 11/1435* (2013.01); *G06F 11/1451* (2013.01); *G06F 21/572* (2013.01); *G06F 21/575* (2013.01); *G06F 2201/84* (2013.01); *G06F 2221/034* (2013.01)

(58) Field of Classification Search
USPC ....................... 714/6.12, 5.11, 5.1
See application file for complete search history.

(56) References Cited

U.S. PATENT DOCUMENTS

| | | | |
|---|---|---|---|
| 2011/0138220 A1* | 6/2011 | Gough | G06F 11/1004 714/5.1 |
| 2012/0011402 A1* | 1/2012 | Chen | G06F 11/2284 714/25 |
| 2012/0110379 A1* | 5/2012 | Shao | G06F 11/1417 714/15 |
| 2015/0106660 A1* | 4/2015 | Chumbalkar | G06F 11/0727 714/42 |

* cited by examiner

*Primary Examiner* — Sarai Butler
(74) *Attorney, Agent, or Firm* — Nixon Peabody LLP; Eduardo J. Quinones

(57) ABSTRACT

A method for recovering a baseboard management controller (BMC) by determining, by a basic input/output system (BIOS), whether a BMC recovery mode is generated by a recovery mode jumper being triggered. The system performing the method can further install, if the recovery jumper is not triggered, a BMC firmware update driver and detect, if the recovery jumper is not triggered, a BMC image. The system that performs the method can further update, if the recovery jumper is not triggered, the BMC firmware and copy to a backup image, if the recovery jumper is not triggered, the BMC firmware update.

26 Claims, 7 Drawing Sheets

BASEBOARD MANAGEMENT CONTROLLER RECOVERY

TECHNICAL FIELD

The subject matter herein generally relates to a baseboard management controller (BMC). More specifically, the subject matter herein relates to a BMC having a recovery system implemented within the BMC.

BACKGROUND

Baseboard management controllers (BMC) are microcontrollers configured to monitor the status of an electronic device such as a computer, network server, or other hardware device. The BMC can include a plurality of sensors and communicate data received from the plurality of sensors regarding the status of the electronic device with a system administrator. However, if a BMC malfunctions, the electronic device will not be monitored and can cause abnormal system operation. Restoring a BMC requires an engineer to manually program the BMC.

BRIEF DESCRIPTION OF THE DRAWINGS

Implementations of the present technology will now be described, by way of example only, with reference to the attached figures, wherein.

DETAILED DESCRIPTION

Figure 1:
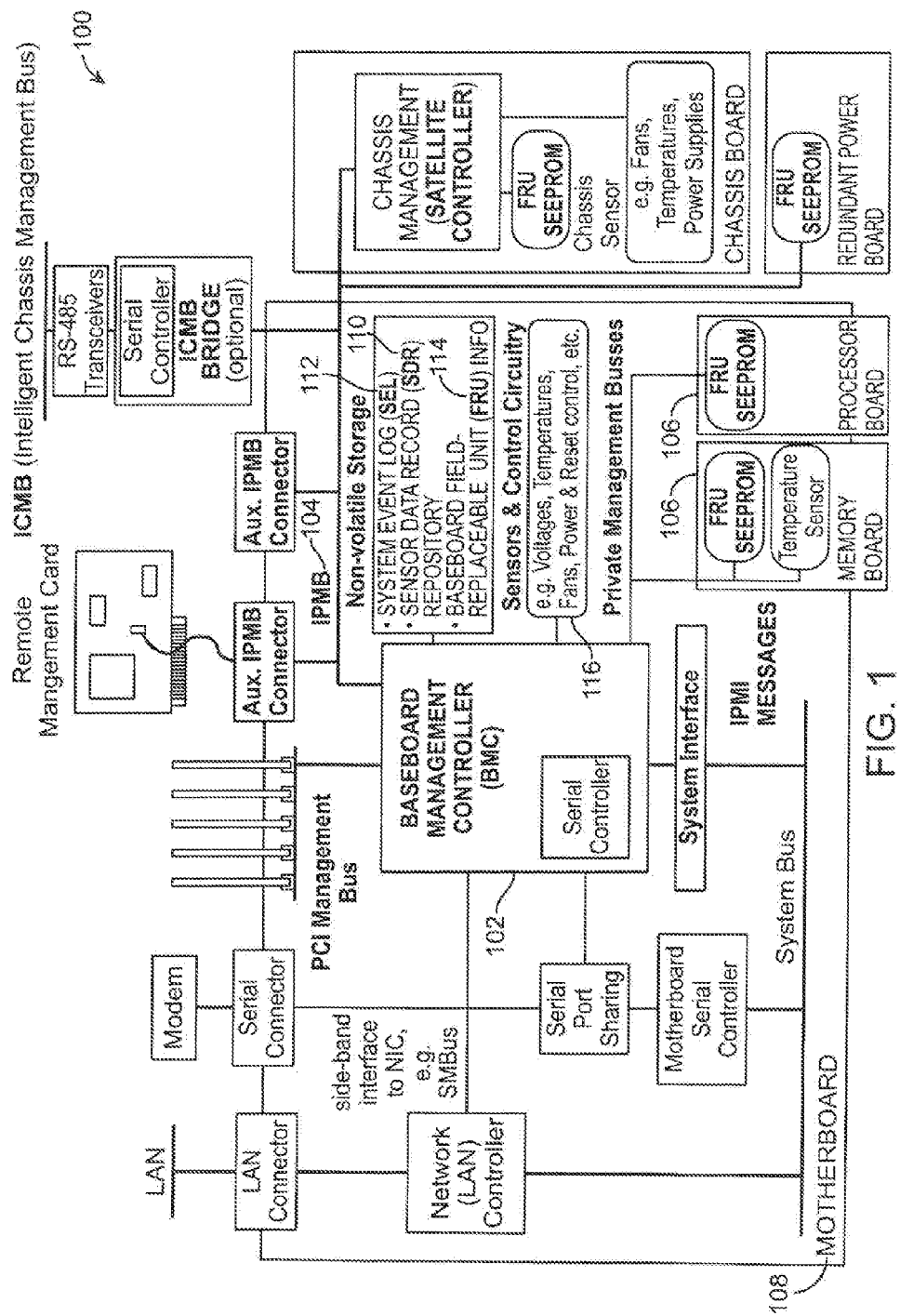
FIG. 1 is a block diagram of an Intelligent Platform Management Interface (IPMI) including a baseboard management controller (BMC)

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is focused on an automatic recovering approach for a malfunctioning baseboard management controller (BMC). A BMC can control and monitor the state of an electronic device using a plurality of sensors and communicating the data collected from the sensors to a user. The BMC can manage the interface between software and hardware of the electronic device. The plurality of sensors can monitor and control parameters such as temperature, fan speed, power status, and operating system (OS) status. However, if the BMC malfunctions, these parameters can go unmonitored potentially causing abnormal operation of the electronic device. The BMC can require reprogramming the firmware to recover and resume normal operations.

The present disclosure describes a system and method for allowing a Basic Input/Output System (BIOS) within the electronic device system to automatically recover the BMC when the BIOS detects an unrecoverable error. The method allows the BIOS to determine whether the error is recoverable. If the error is unrecoverable, the system can install a BMC firmware update driver, detect a recover image, update the BMC firmware, and back up the BMC firmware. The method allows the BIOS to automatically recover a malfunctioning BMC without user intervention reducing the likelihood of an electronic device malfunction due to the BMC malfunction.

The present disclosure describes a system and method for recovering a baseboard management controller. The method determines using a basic input/output system whether a baseboard management controller recovery mode is generated by a recovery mode jumper being triggered to yield a recovery mode jumper status. If the recovery mode jumper status indicates that the recovery jumper is not triggered, the method recovers the baseboard management controller by installing a baseboard management controller firmware update driver. The method can then detect a baseboard management controller image, update the baseboard management controller firmware, and copy to a backup image the baseboard management controller firmware update.

FIG. 1 illustrates a block diagram of an Intelligent Platform Management Interface. An Intelligent Platform Management Interface (IPMI) 100 can provide monitoring, recovery control, logging and inventory of an electronic device. The IPMI 100 can provide these features independent of the electronic device's CPU, BIOS, and/or operating system (OS). These features can be available when the electronic device is shutdown as long as at least one power supply is available. The IPMI 100 can include a software management system and one or more hardware elements.

The IPMI 100 can include a baseboard management controller (BMC) 102. The BMC 102 can be a processor or microcontroller configured to interface between the system management software and the hardware. The BMC 102 can independently monitor, independently logging events, and controlling recovery. The BMC 102 can be coupled to the hardware through an Intelligent Platform Management Bus (IPMB) 104 and an Intelligent Chassis Management Bus (ICMB) 106. The IPMB 104 can allow extension of the BMC 102 through additional management controllers through the application of the IPMB 104 standard. IPMB 104 can be an I$^2$C based serial bus capable of coupling various boards inside of a single chassis. The IPMB 104 can allow communication to and between the additional management controllers. In at least one embodiment, the additional management controllers can be designated as satellite controllers. The ICMB 106 can provide a standardized interface for communication and control between chasses.

As can be appreciated in FIG. 1, the IPMI 100 can include a motherboard 108 upon which the BMC 102 is disposed. The IPMI 100 can store information in a System Event Log (SEL) 110, a Sensor Data Record (SDR) repository 112, and information relating to Field Replaceable Units (FRUs) information 114. The SEL 112 can be a central, non-volatile memory within the BMC 102, thereby allowing the SEL 112 to be accessed in the event of a CPU failure on the electronic device. The SEL 112 can have a limited storage capacity requiring periodic cleaning and deleting the SEL 112 so as to allow additional events to be documented. The SDR repository 112 can store sensor data records relating to the type and number of sensors 116. The sensor data record can be unique to each sensor 116. The sensor data records can be stored in a central, non-volatile storage area called the SDR repository 112 managed by the BMC 102. The sensors 116 can monitor physical characteristics of the electronic device including, but not limited to, voltage, fan speed, temperature, power supply, and inventory. The FRU information 114 can include serial numbers, part numbers, manufactures, models, and inventory numbers. In at least one embodiment, inventory numbers can be referred to as asset tags. The FRU information 114 can be also be stored in a central, non-volatile storage area.

The BMC 102 can have a firmware installed thereon and configured to allow proper function of the BMC 102 and operate the IPMI 100. The BMC 102 can malfunction causing the system hardware to go unmonitored by the sensors 116. Unmonitored system hardware can cause the system to operate abnormally. In at least one embodiment, a fan speed is not adjusted when the temperature sensor 116 registers a high temperature potentially causing the system to overheat. Thus if the BMC 102 malfunctions, the BMC 102 needs to be recovered by reprogramming the firmware.

The IPMI 100 can include additional features and elements shown in FIG. 1, but not specifically discussed. These features are within the scope of the IPMI specification standard including, but not limited to, the IPMI 2.0 specification. The IPMI 100 can implemented within an electronic device (not shown) having a BIOS capable of interacting with the BMC 102, but the IPMI 100 being capable of monitoring the system and its respective components independent of the BIOS. The BIOS can be capable of implementing a routine, including one or more subroutines, to repair a malfunctioning BMC by installing a new BMC firmware therein.

Figure 2:
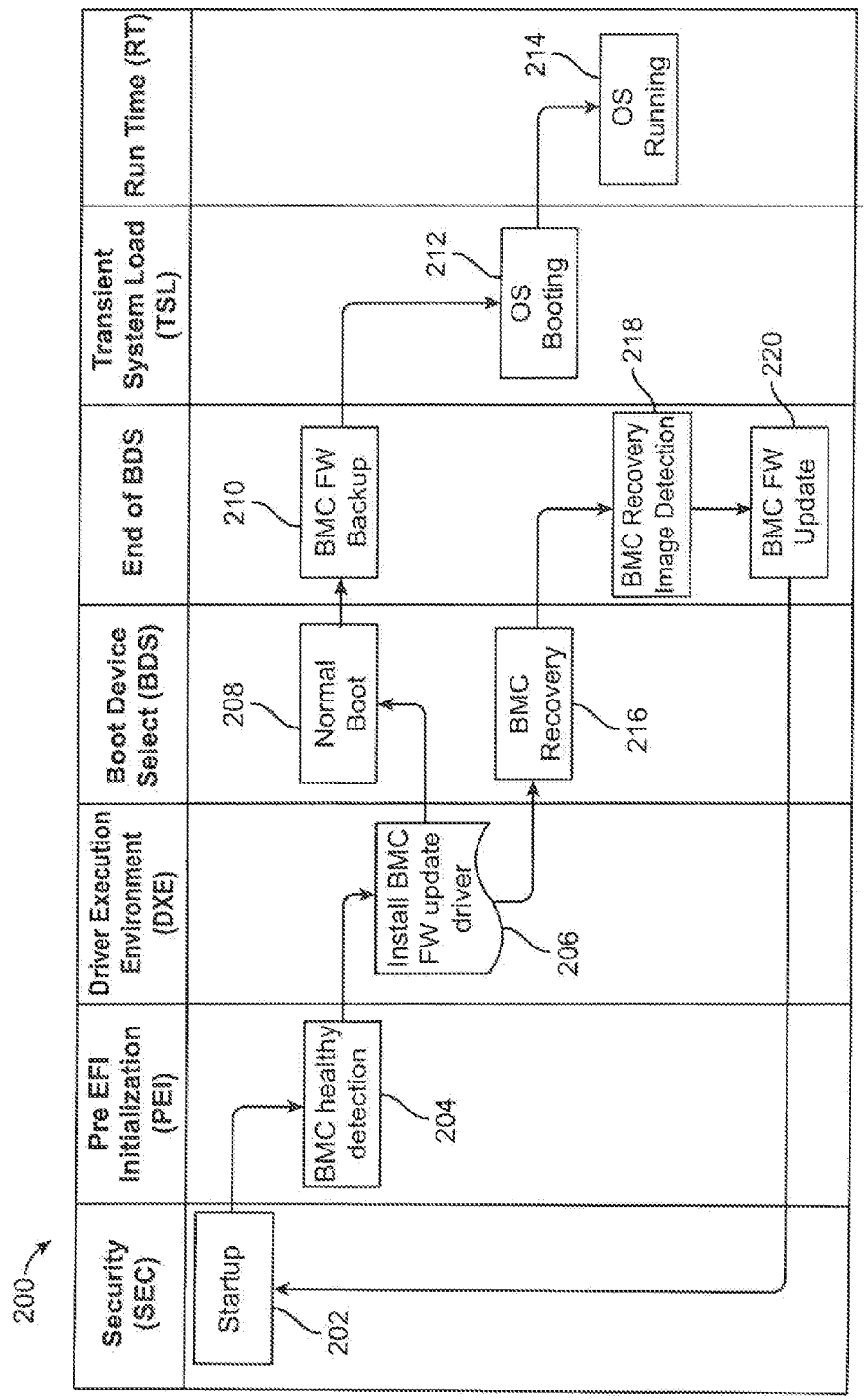
FIG. 2 is diagrammatic view of a BMC Recovery Timeframe.

FIG. 2 illustrates a diagrammatic view of a BMC recovery timeframe. A recovery timeframe of the BMC 200 can involve the initial startup 202 of the IPMI 100 system, which can include powering on the electronic device and the IPMI 100. After start up 202, the BMC recovery timeframe can proceed to a BMC health detection 204. The BMC health detection 204 can determine whether the BMC 102 is functioning properly. The recovery timeframe of the BMC 200 can then proceed to BMC firmware update driver 206. The BMC firmware update driver 206 can provide support for the BMC 102 to allow firmware management support. The firmware management support can include identifying firmware image revision level and programming the image into the device. If the BMC 102 is healthy and does not require recovery, the recovery timeframe 200 can proceed to a normal boot 208, followed by a BMC firmware backup 210, and then an OS booting 212 and a OS running 214. Healthy detection of the BMC 102 can allow normal operation of the IPMI 100 following the normal boot 208 and the BMC firmware backup 210.

If the BMC 102 is malfunctioning, recovery timeframe of the BMC 200 can proceed to BMC recovery 216. The BMC recovery 216 can initiate a sequence to restore a working firmware onto the BMC 102 allowing a return to normal operation. The BMC recovery 216 can be initiated without requiring user intervention. The BMC recovery 216 can then proceed to a BMC recovery image detection 218, which searches for the most recent backup of a working firmware for the BMC 102. The recovery timeframe 200 can then proceed to a BMC firmware update 220, which restores the BMC 102 to a working firmware to allow normal operation of the BMC 102 and IPMI 100. Upon completion of BMC firmware update 220 the recovery timeframe 200 can proceed to start up 202 to restore functionality of the IPMI 100.

Figure 3:
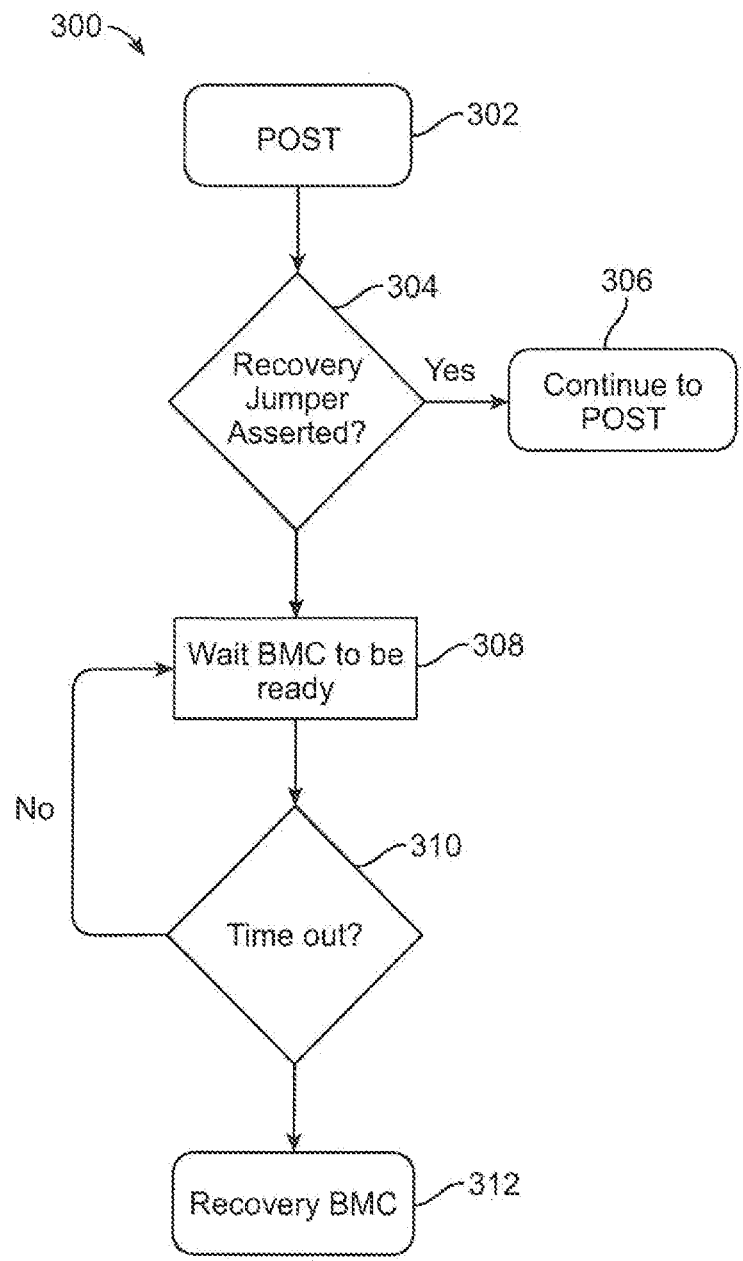
FIG. 3 is a flowchart of a BMC recovery status detection.

FIG. 3 illustrates a flowchart of a BMC recovery status detection. A BMC health detection subroutine 300 can be a subroutine of a BMC Recovery routine and include determining the cause of a BMC recovery mode. The BMC health detection routine 300 can determine whether the BMC is functioning properly or whether the BMC requires recovery. The BMC health detection routine 300 can begin at block 302.

At block 302, the BMC recovery status detection subroutine 300 performs a power on self-test (POST) to check the status of the BMC 102. The subroutine 300 can then proceed to block 304.

At block 304, a basic input/output system (BIOS) will check whether a recovery jumper of the BMC 102 is asserted. The recovery jumper can indicate the cause of the BMC recovery mode status. If the BMC recovery mode is caused by the recovery jumper, the BMC 102 does not require recovery and the BMC health detection routine 300 can proceed to block 306. The BMC can have an recoverable error that does not require BMC recovery. If the BMC recovery mode is not caused by the recovery jumper, the BMC health detection subroutine 300 proceeds to block 308.

At block 306, the BMC health detection routine 300 can continue the POST. The BMC 102 is functioning properly and does not require a new firmware image or intervention from the BIOS.

At block 308, the BMC firmware can have encountered a catastrophic failure and require recovery to prevent system hardware from being unmonitored and out of control. The BMC health detection routine can wait for the BMC to be ready and the subroutine 300 can proceed to block 310.

At block 310, the BMC health detection subroutine 300 can check for whether a time out has occurred. If a time out has not occurred, the routine 300 can return to block 308. If the time out has occurred, the subroutine 300 can proceed to block 312.

At block 312, the recovery BMC can be implemented. The BMC health detection subroutine 300 can determine BMC 102 malfunction is not caused by the recovery jumper and this initiate recovery of the BMC by installing of a new BMC firmware.

Figure 4:
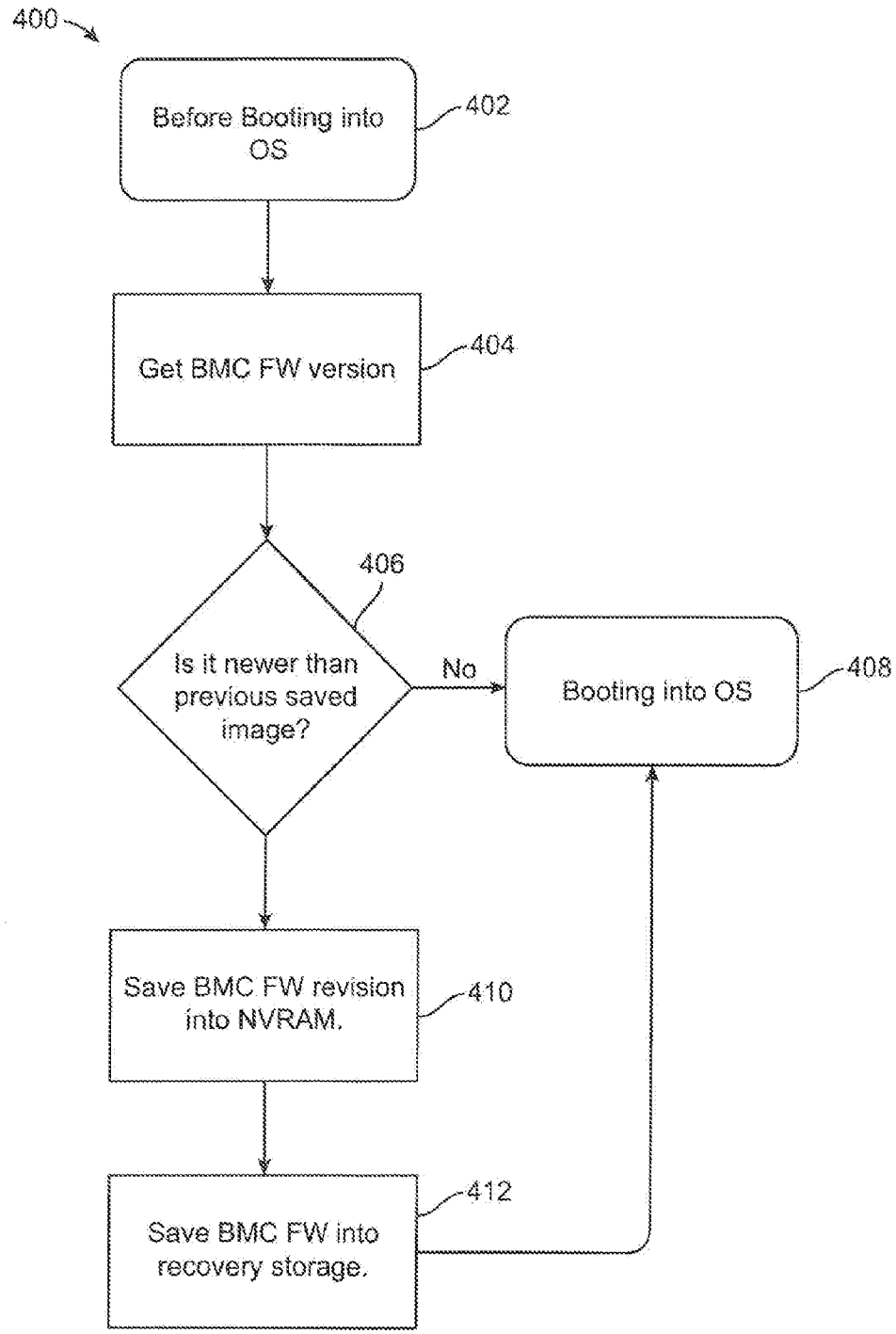
FIG. 4 is a flowchart of a BMC recovery image back up.

FIG. 4 illustrates a flowchart of a BMC recovery image back up. During system power on, the BIOS can install a BMC firmware update driver 206 that provides abstraction for the BMC 102 to provide firmware management support. In at least one embodiment, the BMC firmware update driver 206 can be implemented by a Unified Extensible Firmware Interface (UEFI) Firmware Management Protocol. The BMC firmware update driver 206 can provide for managing device firmware images including identifying firmware image revision level and programming the image into the device.

The UEFI Firmware Management protocol can provide functions including GetImageInfo( ), GetImage( ), SetImage( ), and CheckImage( ). GetImageInfo( ) can get information about the current firmware image(s) of the device to compare with the current saved firmware image. GetImage( ) can get a copy of the current firmware image for the BIOS to perform a BMC firmware roll-back. The BMC firmware roll-back can allow the BIOS to update the BMC 102 with an image of the current firmware to recovery the BMC 102. SetImage( ) can program the device with a new firmware image, and CheckImage( ) an check whether the new firmware image is valid and authorized. These functions can allow the BIOS to automatically recover the BMC upon catastrophic failure of the BMC 102.

As can be appreciated in FIG. 4, the BMC image backup subroutine 400 can begin at block 402. At block 402, the BMC image back up subroutine 400 begins prior to booting into the OS. The subroutine 400 can then proceed to block 404.

At block 404, the BMC image backup subroutine 400 can get the BMC firmware version. The process of get the BMC firmware version can retrieve a healthy BMC firmware and save the healthy BMC firmware image into the recovery media. In at least one embodiment, the process get the BMC firmware version can save the image of the healthy BMC firmware into Universal Serial Bus Disk-on Module (US-DOM), Serial ATA Disk-on Module (SATADOM), or cloud based storage. The subroutine 400 can then proceed to block 406.

At block 406, the BMC image back up can determine whether the healthy BMC firmware image is newer than the previously saved BMC firmware image. If the healthy BMC firmware image is not newer than the previously saved BMC firmware image, the subroutine can proceed to block 408. If the healthy BMC firmware image is newer than the previously saved BMC firmware image, the subroutine 400 can proceed to block 410.

At block 408, the subroutine 400 continues booting into OS. The healthy BMC firmware image is not newer than the previously saved BMC firmware image, thus the healthy BMC firmware image does not need to be saved into the recovery media.

At block 410, the subroutine 400 continues by saving the healthy BMC firmware image into non-volatile random access memory (NVRAM). The healthy BMC firmware image can be a revision to the previously saved BMC firmware image, thus requiring the updated healthy BMC firmware image to be saved in the NVRAM. In at least one embodiment, the healthy BMC firmware image can be a new version or subversion of the BMC firmware. In at least one embodiment, the healthy BMC firmware image can be saved in the NVRAM with previous BMC firmware images. In other embodiments, the healthy BMC firmware image can be saved in the NVRAM and previous BMC firmware images can be removed. The subroutine 400 can then proceed to block 412.

At block 412, the healthy BMC firmware image is saved into recovery storage. In at least one embodiment, the recovery storage can be USBDOM. In other embodiments, the recovery storage can be SATADOM, remote storage, or cloud based storage. The recovery storage is not located within the IPMI architecture, but can be access by the BIOS during BMC recovery. After saving the healthy BMC image into the recovery storage, the subroutine can proceed to block 408.

Figure 5:
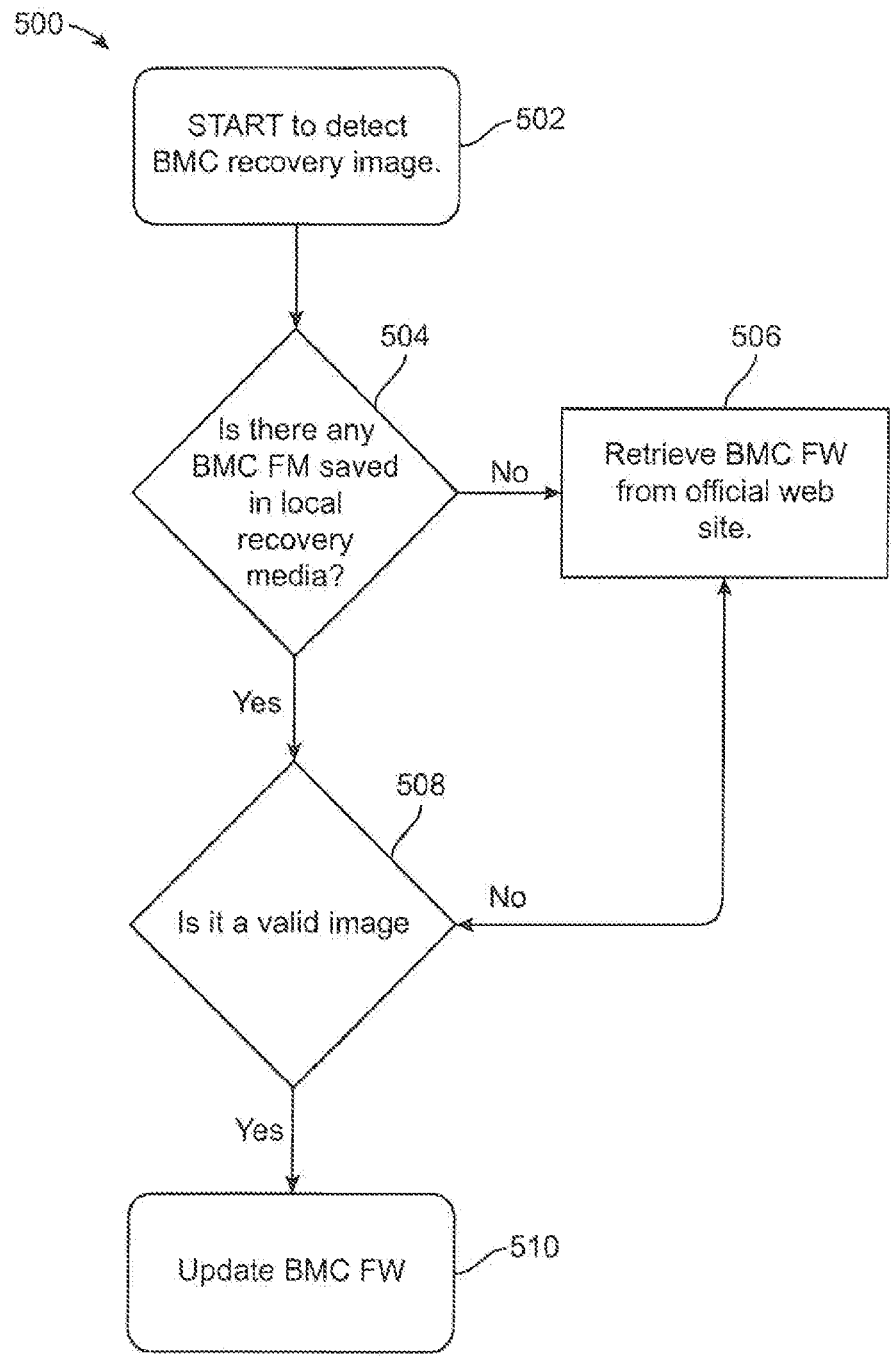
FIG. 5 is a flowchart of a BMC recovery image detection.

FIG. 5 illustrates a flowchart of a BMC recover image detection. The BMC recovery can involve a BMC image detection subroutine 500. The subroutine 500 can begin at block 502. The BMC image detection subroutine 500 can search recovery storage to detect whether there are available authorized BMC images present. The BIOS can invoke CheckImage( ) to check the validity and authorization of the image.

At block 502, the subroutine 500 can begin with the BIOS detecting whether a BMC recovery image can be found. The BIOS can search all recovery media and storage to determine whether an authorized BMC image is present. The BIOS can be authorized to search NVRAM, SATADOM, USBDOM, and cloud based storage. In other embodiments, the BIOS can be authorized to search any available recovery storage. The subroutine 500 can then proceed to block 504.

At block 504, the subroutine 500 can determine whether a BMC firmware is saved in local recovery media. In at least one embodiment, the local recovery media is NVRAM. In other embodiments, the local recovery media can be cloud based storage. If the no BMC firmware image is detected in the local recovery media, the subroutine 500 can proceed to block 506. If a BMC firmware image is detected in the local recovery media, the subroutine 500 can proceed to block 508.

At block 506, the BIOS can connect to the internet to get the newest image of the BMC firmware automatically. In at least one embodiment, the BIOS can access a pre-configured internet address to acquire the newest image of the BMC firmware. In other embodiments, the BIOS can access an official website for the BMC firmware image to acquire the newest image of the BMC firmware. After acquiring a BMC firmware image, the subroutine 500 can then proceed to block 508.

At block 508, the subroutine 500 can determine whether the BMC firmware image is valid and authorized. The subroutine 500 can also check, at block 508, BMC firmware images acquired from the internet to determine whether they are valid and authorized. If the BMC firmware image is invalid and/or unauthorized, the subroutine 500 can return to block 506 to acquire a BMC firmware image from the internet. If the BMC firmware image is valid and authorized, the subroutine 500 can proceed to block 510.

At block 510, the subroutine 500 can update the BMC firmware by replacing the malfunctioning BMC firmware with a fresh image of the BMC firmware. The malfunctioning BMC firmware can be replaced with either a fresh image of the existing BMC firmware or the newly acquired BMC firmware image depending on whether the BIOS was able to find a current BMC firmware image in the recovery media.

Figure 6:
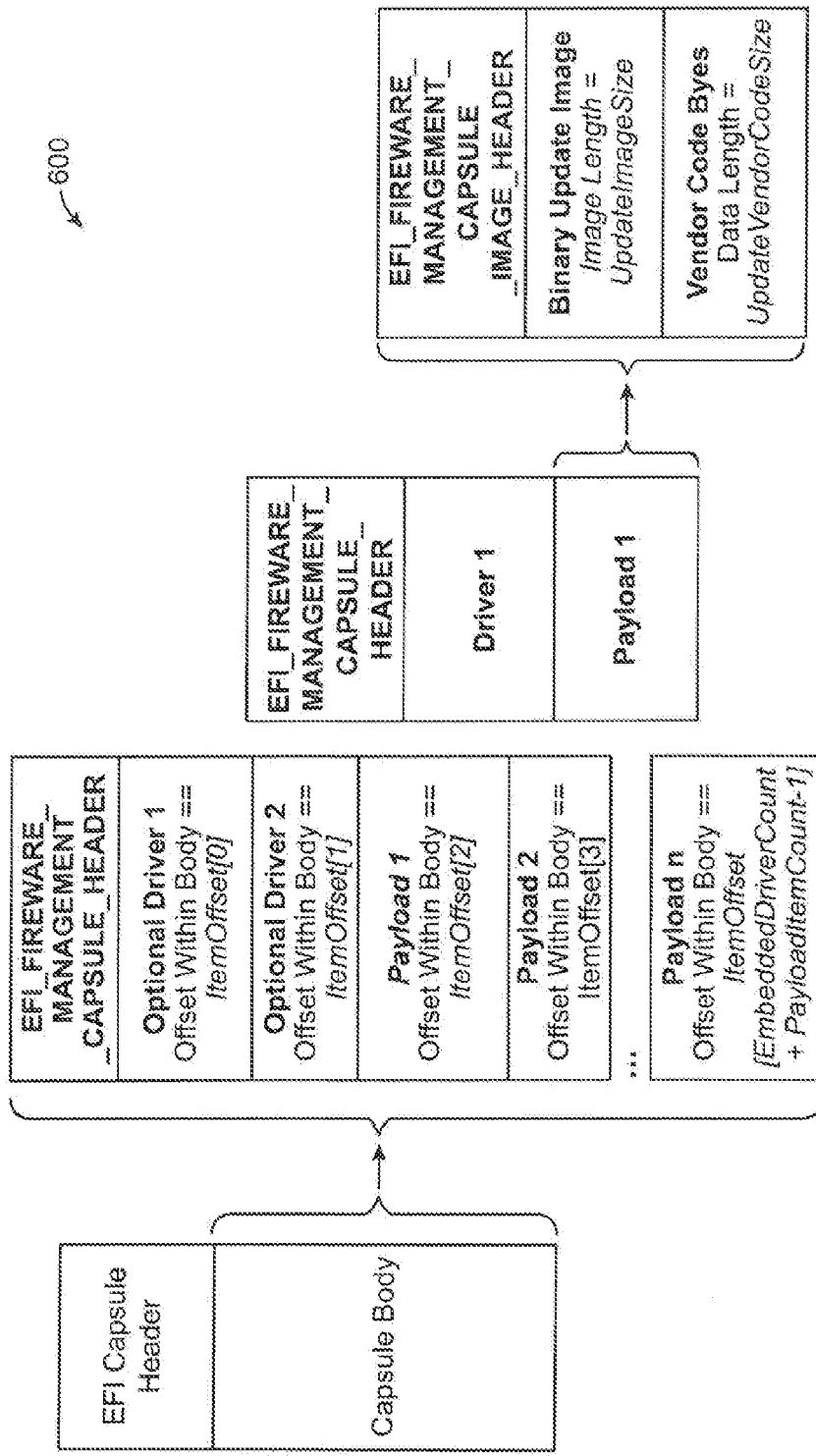
FIG. 6 is a diagrammatic view of a BMC recovery capsule.

FIG. 6 illustrates an example embodiment of a recovery capsule. After a BMC firmware image is acquired and passes Check Image( ) the BIOS can proceed to SetImage( ) to update the BMC firmware. If the BMC update driver is too old to support the new BMC, the SetImage( ) will fail to properly update the BMC firmware. The BIOS can search the local recovery media for a recovery capsule 600, or acquire the latest recovery capsule from the internet. The recovery capsule 600 can contain a new, working BMC firmware update driver. As can be appreciated in FIG. 6, in at least one embodiment the recovery capsule conforms to the UEFI specification. The BIOS can utilize UpdateCapsule( ) from the UEFI specification to implement the recovery capsule and update the BMC firmware update driver.

Figure 7:
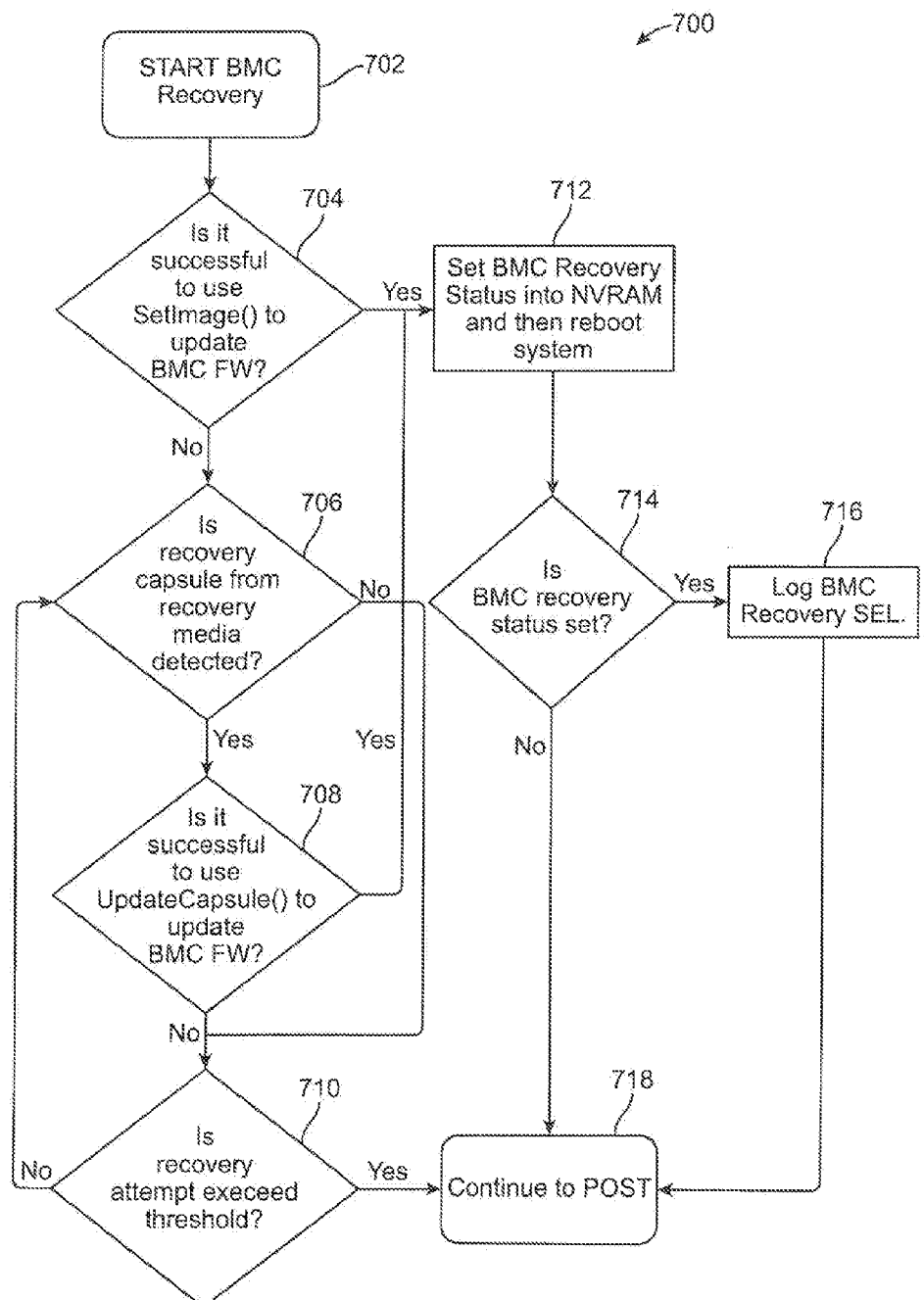
FIG. 7 is a flowchart of a BMC firmware recovery.

FIG. 7 illustrates a flowchart of a BMC firmware recovery. A BMC firmware recovery routine 700 can utilize the subroutines discussed above with respect to FIGS. 3-6 and implemented collectively as part of a larger routine to recover the BMC 102. The BMC firmware recover routine 700 can begin at block 702.

At block 702, the routine starts recovery of the BMC 102. The BMC 102 can have a malfunction causing the system to be unmonitored by the IPMI 100. The unmonitored system can cause abnormal operation, such as potentially allowing the system to overheat or fan speed to not adjust based on temperature sensor readings. After starting recovery of the BMC, the routine 700 can move to block 704.

At block 704, the routine 700 can determine whether it is successful to utilizing the SetImage( ) command to update the BMC FW. The SetImage( ) command seeks to program the device with a new firmware image acquire by the BIOS from recovery storage or the internet. If the SetImage( ) command is successful, the routine can proceed to block 712. If the SetImage( ) command is unsuccessful, the routine can proceed to block 706.

At block 706, the routine 700 determines whether a recovery capsule from recovery media is detected. If a recovery capsule is detected, the routine 700 proceeds to block 708. If not recovery capsule is detected, the routine proceeds to block 710.

At block 708, the routine determines if the UpdateCapsule( ) was successful to update the BMC firmware. The UpdateCapsule( ) can install the new BMC firmware update driver while also updating or recovering the BMC firmware. Successful implementation of new BMC firmware update driver and BMC firmware can restore the BMC to proper functionality. If the UpdateCapsule( ) was unsuccessful, the routine 700 can proceed to block 710. If the UpdateCapsule( ) was successful, the routine 700 can proceed to block 712.

At block 710, the routine 700 determines whether the recovery attempt has exceeded the threshold. The threshold can be a specific number of attempts or a specific amount of time to allow the UpdateCapsule( ) to update the BMC firmware. If the recovery attempt threshold is not exceeded, the routine 700 can proceed to block 706. If the recovery attempt threshold is exceeded, the routine 700 can proceed to block 718.

At block 712, the routine 700 can set the BMC recovery status into the NVRAM and reboot the system. After successfully utilizing either SetImage( ) or Update Capsule( ) the BMC has been recovered and the proper BMC recovery status needs to be updated in the NVRAM. The routine 700 can then proceed to block 714.

At block 714, the routine 700 can determine whether BMC recovery status is set. If the BMC recovery status is set, the routine can proceed to block 716. If the BMC recovery status is no longer set, the routine 700 can proceed to block 718.

At block 716, the routine 700 can log the BMC recovery into the SEL 112. Logging the BMC recovery into the SEL 112 can allow the IPMI 100 to record to the BMC recovery. The routine can then proceed to block 718.

At block 718, the system proceeds to a POST. The BMC 102 can be functioning properly and have a clean image of the latest firmware installed therein. The IPMI 100 can properly monitor the plurality of sensors 116 and control the system by the BMC 102.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. A method for recovering a baseboard management controller, the method comprising:
    determining, by a basic input/output system, whether a baseboard management controller recovery mode is triggered by a physical recovery mode jumper;
    in an event that the recovery mode is not triggered by the physical recovery mode jumper, installing a baseboard management controller firmware update driver configured to identify a revision level of a specific firmware image;
    searching for a baseboard management controller firmware that is the most recent backup version of a working firmware for the baseboard management controller;
    updating, the baseboard management controller with the baseboard management controller firmware; and
    storing a backup image of the baseboard management controller firmware.

2. The method of claim 1, wherein when the recovery mode is not generated by the recovery mode jumper being triggered, the baseboard management controller firmware requires updating.

3. The method of claim 1, wherein when the baseboard management controller recovery mode is generated by the recovery mode jumper, the baseboard management controller continues to a power on self-test.

4. The method of claim 1, wherein installing the baseboard management controller firmware update driver comprises:
    acquiring information about a current firmware image;
    comparing the information about the current firmware image with a current saved firmware image;
    acquiring, when the current firmware image is newer than the current saved firmware image, a copy of the current firmware image for the basic input/output system to perform a baseboard management controller roll-back;
    programming a firmware image; and
    validating the firmware image,
        wherein a baseboard management controller roll-back programs the current firmware image as a new firmware image.

5. The method of claim 4, wherein installing the baseboard management controller firmware update driver further comprises saving the new firmware image into non-volatile random access memory if a current firmware version is newer than the current firmware image.

6. The method of claim 4, wherein installing the baseboard management controller firmware update driver further comprises saving the new firmware image into recovery storage if a current firmware version is newer than the current firmware image.

7. The method of claim 4, wherein installing the baseboard management controller firmware update driver further comprises booting into an operating system.

8. The method of claim 1, wherein when detecting a baseboard management controller image, the basic input/output system searches all recovery storages to detect whether there is any authorized baseboard management controller image present.

9. The method of claim 8, wherein a detected authorized baseboard management controller image can reprogram/recover the baseboard management controller firmware.

10. The method of claim 8, wherein when no authorized baseboard management controller image is detected the basic input/output system acquires a new image to reprogram the baseboard management controller firmware automatically.

11. The method of claim 10, wherein the basic input/output system accesses an internet or official website to acquire the new image.

12. The method of claim 1, wherein updating the baseboard management controller firmware further comprises acquiring a current baseboard management controller firmware update driver within an BIOS.

13. The method of claim 12, wherein the basic input/output system accesses an internet or official website to acquire the current baseboard management controller firmware update driver.

14. A baseboard management controller storing instructions that, when executed by the baseboard management controller, cause the baseboard management controller to perform operations comprising:
   determining, by a basic input/output system, whether a baseboard management controller recovery mode is triggered by a physical recovery mode jumper;
   in an event that the recovery mode is not triggered by the physical recovery mode jumper, installing a baseboard management controller firmware update driver configured to identify a revision level of a specific firmware image;
   searching for a baseboard management controller firmware that is the most recent backup version of a working firmware for the baseboard management controller;
   updating the baseboard management controller with the baseboard management controller firmware; and
   storing a backup image of the baseboard management controller firmware.

15. The baseboard management controller of claim 14, wherein when the recovery mode is not generated by the recovery mode jumper being triggered, the baseboard management controller firmware requires updating.

16. The baseboard management controller of claim 14, wherein when the baseboard management controller recovery mode is generated by the recovery mode jumper, the baseboard management controller continues to a power on self-test.

17. The baseboard management controller of claim 14, further comprising instructions, which, when installing the baseboard management controller firmware update driver, cause the baseboard management controller to perform further operations comprising:
   acquiring information about a current firmware image;
   comparing the information about the current firmware image with a current saved firmware image;
   acquiring, when the current firmware image is newer than the current saved firmware image, a copy of the current firmware image for the basic input/output system to perform a baseboard management controller roll-back;
   programming a firmware image; and
   validating the firmware image,
      wherein a baseboard management controller roll-back programs the current firmware image as a new firmware image.

18. The baseboard management controller of claim 17, further including instructions, when installing the baseboard management controller firmware update driver, that cause the baseboard management controller to: save the new firmware image into non-volatile random access memory if a current firmware version is newer than the current firmware image.

19. The baseboard management controller of claim 17, further including instructions, when installing the baseboard management controller firmware update driver, that cause the baseboard management controller to: save the new firmware image into recovery storage if a current firmware version is newer than the current firmware image.

20. The baseboard management controller of claim 17, further including instructions, when installing the baseboard management controller firmware update driver, that cause the baseboard management controller to: boot into an operating system.

21. The baseboard management controller of claim 14, wherein the basic input/output system searches all recovery storages to detect whether there is any authorized baseboard management controller image present.

22. The baseboard management controller of claim 21, wherein a detected authorized baseboard management controller image can reprogram/recover the baseboard management controller firmware.

23. The baseboard management controller of claim 21, wherein when no authorized baseboard management controller image is detected the basic input/output system acquires a new image to reprogram the baseboard management controller firmware automatically.

24. The baseboard management controller of claim 23, wherein the basic input/output system accesses an internet or official website to acquire the new image.

25. The baseboard management controller of claim 14, wherein updating the baseboard management controller firmware further comprises acquiring a current baseboard management controller firmware update driver within the basic input/output system.

26. The baseboard management controller of claim 25, wherein the basic input/output system accesses the internet or official website to acquire the current baseboard management controller firmware update driver.

* * * * *